United States Patent
Fundytus et al.

(10) Patent No.: US 11,060,368 B2
(45) Date of Patent: Jul. 13, 2021

(54) MULTI-CABLE WIRELINE GUIDE SYSTEMS AND METHODS

(71) Applicant: Schlumberger Technology Corporation, Sugar Land, TX (US)

(72) Inventors: Nicholas Fundytus, Houston, TX (US); Alejandro Martinez Pereira, Houston, TX (US); Colin Wilson, Sugar Land, TX (US); Richard Parker, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/660,061

(22) Filed: Oct. 22, 2019

(65) Prior Publication Data

US 2020/0123865 A1    Apr. 23, 2020

Related U.S. Application Data

(60) Provisional application No. 62/748,780, filed on Oct. 22, 2018.

(51) Int. Cl.
*E21B 23/14*    (2006.01)
*E21B 47/01*    (2012.01)
*E21B 17/02*    (2006.01)

(52) U.S. Cl.
CPC ............ *E21B 23/14* (2013.01); *E21B 17/026* (2013.01); *E21B 47/01* (2013.01)

(58) Field of Classification Search
CPC .......... E21B 23/14; E21B 47/01; E21B 17/026
See application file for complete search history.

(56) References Cited

U.S. PATENT DOCUMENTS

| | | | | |
|---|---|---|---|---|
| 3,957,118 A * | 5/1976 | Barry | ..................... | E21B 23/14 166/385 |
| 4,202,087 A * | 5/1980 | Wilderman | ............. | E21B 19/24 166/243 |
| 4,585,066 A * | 4/1986 | Moore | ..................... | E21B 19/22 166/302 |
| 7,784,537 B2 * | 8/2010 | Baxter | ................... | B21D 22/02 166/241.6 |
| 8,312,934 B2 * | 11/2012 | Coronado | ........... | E21B 17/1035 166/385 |
| 9,187,963 B2 * | 11/2015 | Richards | ............. | E21B 17/1035 |
| 9,988,893 B2 * | 6/2018 | McCoy | ................... | E21B 47/00 |
| 10,718,202 B2 * | 7/2020 | McCoy | ................. | E21B 47/017 |
| 2017/0260815 A1 * | 9/2017 | Levie | .................... | E21B 17/026 |

* cited by examiner

Primary Examiner — Nicole Coy
(74) Attorney, Agent, or Firm — Trevor G. Grove (57) ABSTRACT

A well-logging system includes a first downhole tool coupled to a first cable for conveying the first downhole tool along a wellbore. A second downhole tool having a housing is coupled to a second cable for conveying the second downhole tool along the wellbore. The well-logging system includes a cable guide having a chassis structure coupled to the housing and a sleeve coupled to the chassis structure and disposed about the first cable. The first cable is configured to translate along the sleeve such that the sleeve facilitates guided movement of the first downhole tool relative to the second downhole tool.

18 Claims, 7 Drawing Sheets

MULTI-CABLE WIRELINE GUIDE SYSTEMS AND METHODS

CROSS-REFERENCE TO RELATED APPLICATIONS

This disclosure claims the benefit of and priority to U.S. Provisional Patent Application No. 62/748,780, titled "Multi-Cable Wireline Guide Systems and Methods," filed Oct. 22, 2018, which is incorporated by reference herein in its entirety for all purposes.

BACKGROUND

This disclosure relates to systems and methods for a multi-cable wireline guide of a wireline system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements taken with downhole well-logging tools that are conveyed deep into the wellbore. The measurements may be used to infer properties and characteristics of the geological formation surrounding the wellbore. Thus, when a wellbore is investigated to determine a characteristic of a subterranean formation, a fluid and/or gas within the subterranean formation, or a condition of an operation (e.g. hydraulic fracturing) in the subterranean formation, it may be desirable to place downhole well-logging tools with associated measurement tools and/or sensors within the wellbore.

In some cases, a well-logging system may be used to convey a downhole well-logging tool through the geological formation. For example, the well-logging system may include a winch that spools or unspools a cable, thus enabling the cable to raise or lower the downhole well-logging tool within the wellbore. Unfortunately, deploying a single downhole well-logging tool within the wellbore may limit data acquisition of wellbore parameters to a particular location of the wellbore.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment in accordance with aspects of the present disclosure relates to a well-logging system. The well-logging system includes a first downhole tool coupled to a first cable configured to convey the first downhole tool along a wellbore. The well-logging system also includes a second downhole tool having a housing, where the second downhole tool is coupled to a second cable configured to convey the second downhole tool along the wellbore. The well-logging system includes a cable guide having a chassis structure coupled to the housing and a sleeve coupled to the chassis structure and disposed about the first cable. The first cable is configured to translate along the sleeve such that the sleeve facilitates guided movement of the first downhole tool relative to the second downhole tool.

Another embodiment in accordance with aspects of the present disclosure relates to a cable guide for a well-logging system. The cable guide includes a sleeve configured to extend about and translate along a cable of a first downhole tool. The cable guide also includes a chassis structure having one or more clamps configured to engage with a housing of a second downhole tool to couple the chassis structure to the housing. The chassis structure is configured to interlock with the sleeve to couple the sleeve with the chassis structure.

Another embodiment in accordance with aspects of the present disclosure relates to a method. The method includes extending a cable of a first downhole tool through a sleeve of a cable guide such that the cable is configured to translate along the sleeve. The method also includes coupling a chassis structure of the cable guide to a housing of a second downhole tool and interlocking the sleeve to the chassis structure of the cable guide. The method further includes conveying, via the cable, the first downhole tool along a wellbore, where the cable guide is configured to guide movement of the cable relative to the second downhole tool such that the first downhole tool moves along the wellbore relative to the second downhole tool.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As noted above, downhole tools may be conveyed through a wellbore using a cable that is spooled or unspooled on a winch or a drum. Accordingly, the downhole tool may be used to investigate a characteristic of a subterranean formation, a fluid and/or gas within the subterranean formation, or a condition of an operation (e.g. hydraulic fracturing) in the subterranean formation. The downhole tool may also be used to investigate physical characteristics of fluids or gases within the wellbore and/or a casing of the wellbore. Conventional well-logging systems are typically equipped to traverse a single downhole tool through a geological formation at a particular time. Unfortunately, this may limit acquisition of wellbore measurements to a particular location (e.g., a single location) within the wellbore. In many cases, it may be desirable to acquire data measurements or sensor feedback indicative of well-bore properties at multiple locations of the wellbore simultaneously. For example, it may be desirable to acquire data measurements near a first portion of the wellbore using a first downhole tool, while simultaneously acquiring data measurements near a second portion of the wellbore using a second downhole tool.

Accordingly, embodiments of the present disclosure are directed toward a cable guide that enables the well-logging system to individually traverse a pair of downhole tools through a wellbore. In particular, the cable guide enables respective cables to raise or lower the downhole tools within the wellbore without risk of entanglement between the cables. As such, the well-logging system may be used to acquire data measurements near multiple portions of the wellbore concurrently. The cable guide includes a removable sleeve that receives a first cable associated with a first of the downhole tools. That is, the first cable extends through the sleeve of the cable guide. The cable guide also include a chassis structure having one or more clamps extending therefrom. The clamps engage with and couple to a second of the downhole tools. The sleeve couples to a slot disposed within the chassis structure of the cable guide. In this manner, the second downhole tool may be guided along the first cable of the first downhole tool when traversing into or out of the wellbore. That is, the cable guide may enable the second downhole tool and the first cable to translate axially relative to one another (e.g., in a direction along a length of the cables) while lateral movement between the second downhole tool and the first cable, at the cable guide, is blocked. As such, the cable guide may enable the first and second downhole tools to traverse the wellbore independently, while mitigating a risk of entanglement between the first cable and the second cable. These and other features will be described below with reference to the drawings.

Figure 1:
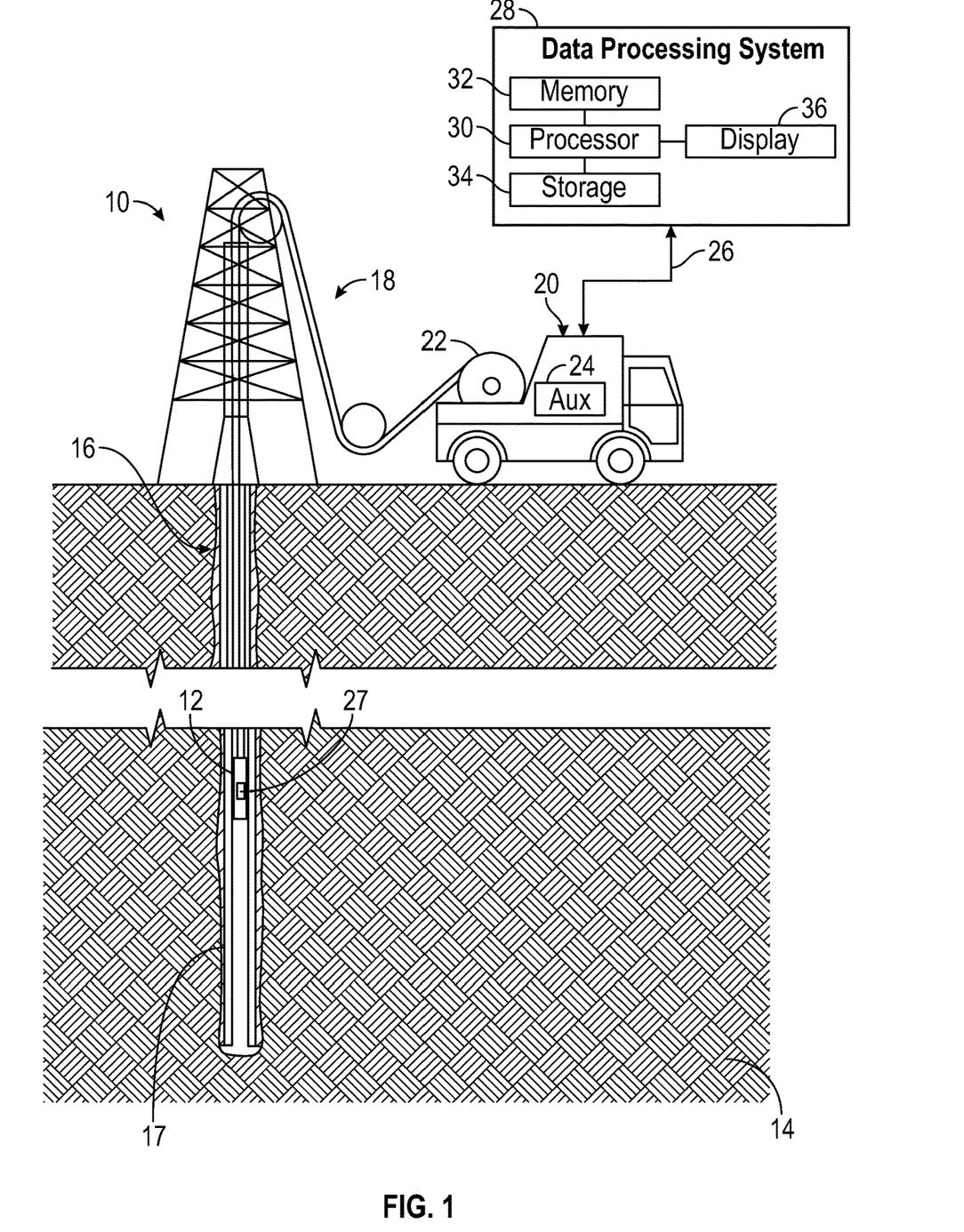
FIG. 1 is a schematic diagram of a well-logging system, in accordance with an embodiment of the present disclosure.

With the foregoing in mind, FIG. 1 illustrates a well-logging system 10 that may employ the systems and methods of this disclosure. The well-logging system 10 may be used to convey a downhole tool 12 or a dummy weight through a geological formation 14 via a wellbore 16. In some embodiments, a casing 17 may be disposed within the wellbore 16, such that the downhole tool 12 may traverse the wellbore 16 within the casing 17. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any cable 18 suitable for well logging may be used. The cable 18 may be spooled and unspooled on a winch 22 and an auxiliary power source 24 may provide energy to the logging winch system 20 and/or the downhole tool 12.

In some embodiments, the downhole tool 12 may include one or more sensors 27 that enable the downhole tool 12 to measure wellbore parameters (e.g., geophysical and/or petrophysical properties of the wellbore 16) and/or properties of the casing 17 disposed within the wellbore 16. For example, the one or more sensors 27 may include accelerometers, rate sensors, pressure transducers, electromagnetic sensors, acoustic sensors, and/or any additional suitable sensors. Accordingly, the downhole tool 12 may provide logging measurements 26 to a data processing system 28 via any suitable telemetry (e.g., via electrical or optical signals pulsed through the geological formation 14 or via mud pulse telemetry). The data processing system 28 may thus process the logging measurements 26. The logging measurements 26 may indicate certain properties of the wellbore 16 and/or the casing 17 (e.g., pressure, temperature, strain, vibration, or other) that might otherwise be indiscernible by a human operator.

As shown in the illustrated embodiment of FIG. 1, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the logging measurements 26.

Figure 2:
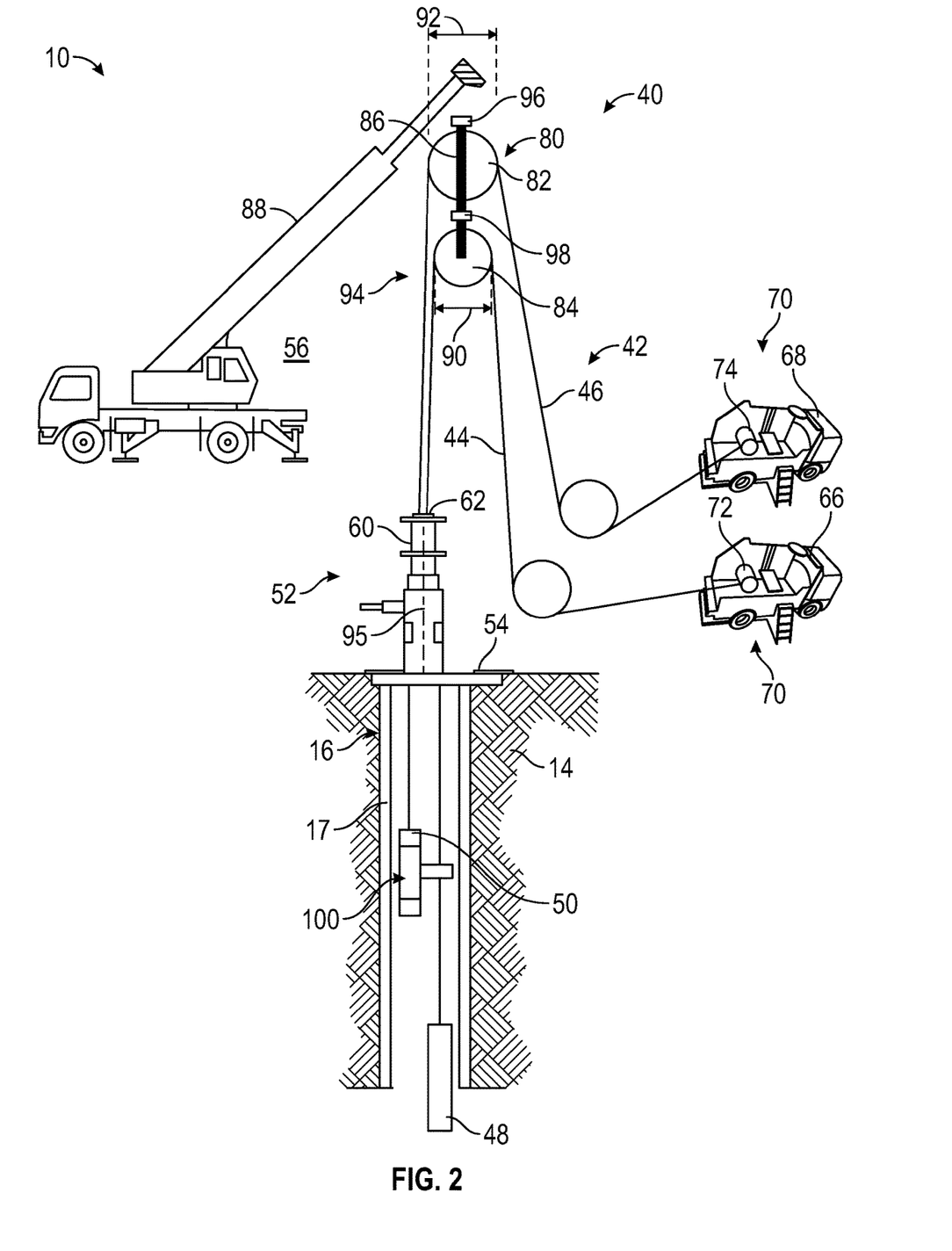
FIG. 2 is a schematic diagram of an embodiment of the well-logging system of FIG. 1, in accordance with an embodiment of the present disclosure.

FIG. 2 illustrates an exemplary embodiment of the well-logging system 10 of FIG. 1, having a multi-cable entry system 40. The multi-cable entry system 40 may enable the well-logging system 10 to simultaneous deploy a pair of cables 42 within the wellbore 16. Specifically, the multi-cable entry system 40 may enable the well-logging system 10 to individually tractor (e.g., traverse) a first cable 44 and a second cable 46 through the wellbore 16. Accordingly, the first and second cables 44, 46 may respectively guide a first downhole tool 48 (e.g., the downhole tool 12) and a second downhole tool 50 along various portions of the geological formation 14. As shown in the illustrated embodiment, the multi-cable entry system 40 may include wellbore equipment or pressure control equipment 52 that is disposed near a surface 54 of the geological formation 14 and receives the cables 42. In particular, the pressure control equipment 52 enables movement of the cables 42 into or out of the wellbore 16, while substantially blocking pressurized fluid within the wellbore 16 from leaking into an ambient environment 56 (e.g., the atmosphere).

As an example, in some embodiments, the pressure control equipment 38 includes a pack-off 60 (e.g., a dual entry pack-off) that forms a fluidic seal around each of the cables 42. Specifically, the cables 42 may pass through respective annular openings defined within a receiving portion 62 (e.g., a tulip) of the pack-off 60, which conform to an external surface of the cables 18. Accordingly, the receiving portion 62 may form fluid seals between the cables 42 and a housing of the pack-off 60. In this manner, the pack-off 60 may mitigate wellbore fluids or other contaminants, such as grease, from entering the wellbore 16 or discharging from the wellbore 16. It should be appreciated that, in other embodiments, the pressure control equipment 52 may include any other suitable component or combination of components that may facilitate traversing the cables 42 and their respective downhole tools 48, 50 through the wellbore 16. As an example, the pressure control equipment 52 may additionally or alternatively include a lubricator, a tool trap, a pump-in-sub, cable shearing device(s), one or more motorized rollers, or any other suitable component(s).

In the illustrated embodiment, the well-logging system 10 includes a first logging winch system 66 and a second logging winch system 68 that which may each include some, or all of the components of the logging winch system 20 of FIG. 1. To facilitate discussion, the first and second logging winch systems 66, 68 are collectively referred to herein as logging winch trucks 70. As discussed in greater detail below, the logging winch trucks 70 may cooperate to individually traverse the cables 42 through the pack-off 60 and the wellbore 16. That is, a first winch 72 of the first logging winch system 66 may spool or unspool the first cable 44, while a second winch 74 of the second logging winch system 68 may spool or unspool the second cable 46. Although the first and second logging winch systems 68, 66 are shown as individual logging trucks in the illustrated embodiment, it should be noted that in other embodiments, a single logging winch system (e.g., a single logging winch truck) having a pair of individually operable winches may be used to respectively traverse the cables 42 through the wellbore 16.

As shown in the illustrated embodiment, the well-logging system 10 may include a dual sheave 80 that guides the cables 42 while the cables 42 are spooled or unspooled from the logging winch trucks 70. The dual sheave 80 may include an upper sheave wheel 82 and a lower sheave wheel 84 that are coupled to one another via a frame 86. The frame 86 may be suspended above the pressure control equipment 52 via a crane 88 or other suitable support structure. In certain cases, a diameter 90 of the lower sheave wheel 84 may be less that a diameter 92 of the upper sheave wheel 82. In this manner, the dual sheave 80 may facilitate concentrically aligning the cables 42 to a corresponding one of the apertures defined within the receiving portion 62 of the pack-off 60. In addition, the dual sheave 80 may align a downstream section 94 of the cables 42 substantially parallel to a centerline 95 of the pack-off 60. In this manner, the dual sheave 80 may ensure that the cables 42 do not enter the pack-off 60 at an angle (e.g., at an angle relative to the centerline 95), and thus mitigate or substantially eliminate frictional forces that may be generated due to physical contact between the cables 42 and the receiving portion 62 of the pack-off 60 during spooling or unspooling of the cables 42 from the first and second winches 72, 74.

In certain embodiments, the dual sheave 80 may include a first swivel 96, a second swivel 98, or both, which enable at least partial rotational movement of the upper and lower sheave wheels 82, 84 about a longitudinal axis (e.g., a length dimension) of the frame 86. That is, the upper and lower sheave wheels 82, 84 may rotate relative to the crane 88, and relative to one another. As such, the first and second swivels 96, 98 may enable the cables 42 to enter the pressure control equipment 52 in a suitable manner even when the first and second logging winch systems 66, 68 are circumferentially offset with respect to the centerline 96 of the pack-off 60. Accordingly, the first and second swivels 96, 98 may mitigate binding of the cables 42 that may be caused by misalignment between the cables 42 and the upper and lower sheave wheels 82, 84 of the dual sheave 80.

As discussed in detail below, the multi-cable entry system 40 also includes a cable guide 100 that is coupled to a housing of the first downhole tool 48 or a housing of the second downhole tool 50 and enables the first and second cables 44, 46 to traverse the wellbore 16 simultaneously without risk of entanglement. For sake of example, in the following discussion, the cable guide 100 is described as being coupled to a housing of the second downhole tool 50.

Figure 3:
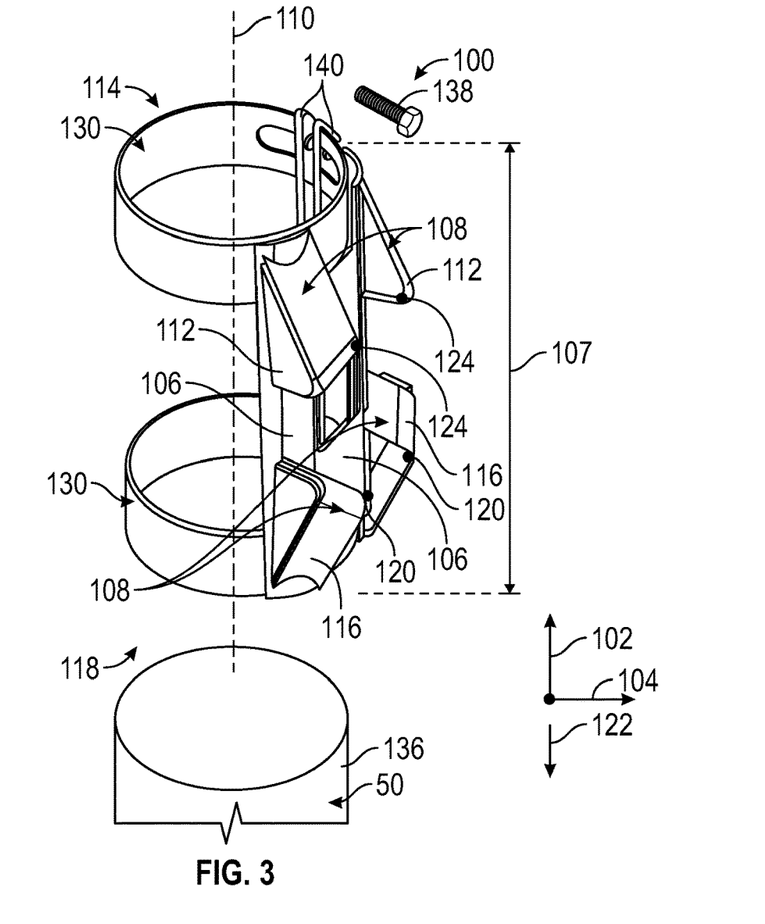
FIG. 3 is a perspective view of an embodiment of a cable guide that may be used to facilitate traversing multiple downhole well-logging tools through a wellbore, in accordance with an embodiment of the present disclosure.

FIG. 3 is a perspective view of an embodiment of the cable guide 100. To facilitate the following discussion, the cable guide 100 and its components will be described with reference to a longitudinal axis or direction 102 and a radial axis or direction 104. As shown in the illustrated embodiment, the cable guide 100 includes a chassis structure 106 that extends along a length 107 of the cable guide 100. The chassis structure 106 includes protrusion members 108 that extend generally radially from a central axis 110 of the cable guide 100. More specifically, the protrusion members 108 include a pair of upper members 112 (e.g., upper protrusion members) that are situated near a first end portion 114 of the cable guide 100 and a pair of lower members 116 (e.g., lower protrusion members) that are situated near a second end portion 118 of the cable guide 100. As shown in the illustrated embodiment, the lower members 116 diverge radially from the cable guide 100 along the longitudinal direction 102, from the second end portion 118 of the cable guide 100 to respective tip portions 120 of the lower members 116. Conversely, the upper members 112 diverge radially from the cable guide 100 in a direction 122 that is substantially opposite the longitudinal direction 102, from the first end portion 114 of the cable guide 100 to respective tip portions 124 of the upper members 112. The protrusion members 108 may be coupled to the chassis structure 106 using suitable fasteners, adhesives, metallurgical processes such as welding or brazing, or any other suitable fastening method. Although two upper members 112 and two lower members 116 are shown in the illustrative embodiment of FIG. 3, it should be noted that upper and lower members 112, 116 may each include more than two, or less that two individual protrusion members. That is, the upper members 112, the lower members 116, or both, may each include 1, 2, 3, 4, 5, or more than 5 protrusions members that are coupled to the chassis structure 106.

A pair of clamps 130 are coupled to the chassis structure 106 near the first end portion 114 and the second end portion 118 of the chassis structure 106, respectively. The clamps 130 may include a cross-sectional shape that is geometrically similar to a cross-sectional shape of the second downhole tool 50. For sake of example, in the illustrated embodiment, the second downhole tool 50 is shown as having a substantially circular cross-section. Accordingly, a cross-sectional shape of the clamps 130 may be generally circular, such that the cable guide 100 may be slide over an exterior surface of a housing 136 of the second downhole tool 50. After the cable guide 100 is situated on the second downhole tool 50 (e.g., slid over the second downhole tool 50), suitable fasteners 138 may be used compress flanges 140 of the clamps 130 toward one another. In this manner, the fasteners 138 may be used to constrict an inside diameter of the cable guide 100 (e.g., an inside diameter of the clamps 130), such that the cable guide 100 exerts a compressive force on the housing 136 of the second downhole tool 50. Accordingly, the fasteners 138 may be used to removably couple the cable guide 100 to the housing 136 of the second downhole tool 50.

Figure 4:
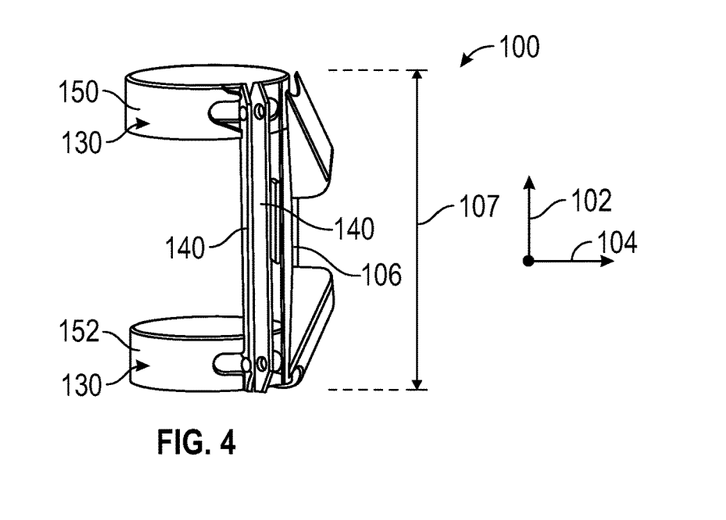
FIG. 4 is a perspective view of an embodiment of the cable guide, in accordance with an embodiment of the present disclosure.

FIG. 4 is an alternate perspective view of an embodiment of the cable guide 100, illustrating the flanges 140. As shown in the illustrated embodiment, each of the flanges 140 extend along the length 107 of the cable guide 100 from a first clamp 150 to a second clamp 152 of the clamps 130. In this manner, the flanges 140 may enhance a rigidity of the cable guide 100 and/or the first and second clamps 150, 152. However, in other embodiments, the first and second clamps 150, 152 may each include individual flanges. In other words, in such embodiments, the flanges 140 may not extend between the first clamp 150 and the second clamp 152.

Although the second downhole tool 50 and the clamps 130 are described as including a generally circular cross-section in the embodiments of the cable guide 100 discussed herein, it should be noted that in other embodiments, the second downhole tool 50 and the clamps 130 may each include any other suitable cross-sectional shape. As a non-limiting example, in embodiments where the second downhole tool 50 includes a triangular cross-section, a pentagonal cross-section, or a hexagonal cross-section, the clamps 130 of the cable guide 100 may include a triangular cross-section, a pentagonal cross-section, or a hexagonal cross-section respectively. In any case, by matching the cross-sectional shape of the cable guide 100 (e.g., a cross-sectional shape of the clamps 130) to the cross-sectional shape of the second downhole tool 50 (e.g., a cross-sectional shape of the housing 136), the cable guide 100 may slide tightly over the second downhole tool 50 regardless of the cross-sectional shape of the second downhole tool 50. Moreover, although the cable guide 100 is shown as including two clamps 130 (e.g., the first clamp 150, the second clamp 152) in the illustrated embodiment of FIG. 4, it should be noted that the cable guide 100 may alternatively include any other suitable quantity of clamps extending from the chassis structure 106. That is, the cable guide may include 1, 2, 3, 4, 5, or more than 5 clamps 130 that engage with the housing 136 of the second downhole tool 50.

Figure 5:
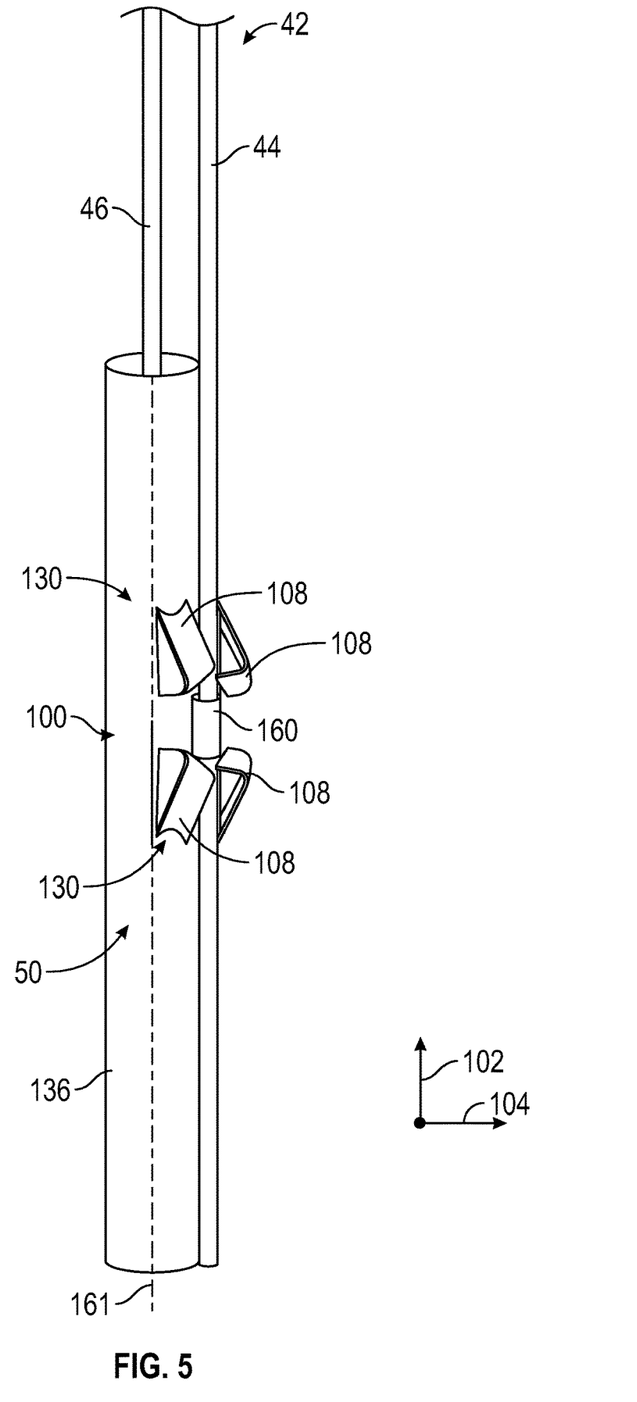
FIG. 5 is a perspective view of an embodiment of the cable guide coupled to a downhole well-logging tool, in accordance with an embodiment of the present disclosure.
Figure 6:
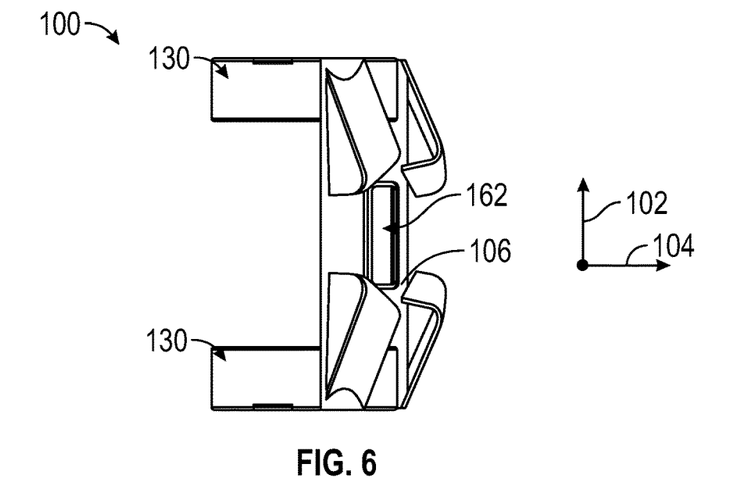
FIG. 6 is a perspective view of an embodiment of the cable guide, in accordance with an embodiment of the present disclosure.

FIG. 5 is a perspective view of an embodiment of the cable guide 100 coupled to the housing 136 of the second downhole tool 50. As shown in the illustrated embodiment, the cable guide 100 includes a sleeve 160 that engages with, couples to, or otherwise interlocks with a slot 162 (e.g., as shown in FIG. 6) disposed within the chassis structure 106. The first cable 44 extends through the sleeve 160, such that the second downhole tool 50 may be guided along the first cable 44. That is, the sleeve 160 may enable axial movement of the first cable 44 relative to the cable guide 100, while substantially blocking radial movement (e.g., along the radial direction 104) of the first cable 44 relative to the cable guide 100. In this manner, the cable guide 100 may mitigate a likelihood of entanglement of the first and second cables 44, 46 as the first and second downhole tools 48, 50 are traversed through the wellbore 16.

In some embodiments, the protrusion members 108 may protrude radially beyond the sleeve 160 (e.g., with respect to a central axis 161 of the second downhole tool 50 and/or the central axis 110 of the cable guide 100). As such, the protrusion members 108 may ensure that the second downhole tool 50 does not compress the first cable 44 against an interior surface of the casing 17 or an interior surface of the geological formation 14. That is, the protrusion members 108 may maintain a radial gap between an exterior surface of the housing 136 of the second downhole tool 50 and the interior surface of the casing 17 or the geological formation 14 that is larger than a diameter of the first cable 44. Accordingly, the protrusion members 108 may ensure that the first cable 44 does not scrape or rub against casing 17 or the geological formation 14 during operation of the well-logging system 10, which may reduce wear on the first cable 44 and enable the first cable 44 to operate more effectively. In certain embodiments, a sensor (e.g., the one or more sensors 27) of the second downhole tool 50 may be situated between the clamps 130, such that the clamps 130 may physically protect the sensor against contact with the casing 17 and/or the geological formation 14.

As such, the cable guide 100 may enable the well-logging system 10 to simultaneously traverse the first downhole tool 48 and the second downhole tool 50 through various portions of the wellbore 16, without interference between the first and second cables 44, 46. Accordingly, the cable guide 100 may enable the collection of wellbore measurements using a pair of downhole tools (e.g., the first and second downhole tools 48, 50), rather than using a single downhole tool, such as in conventional well-logging systems.

Figure 7:
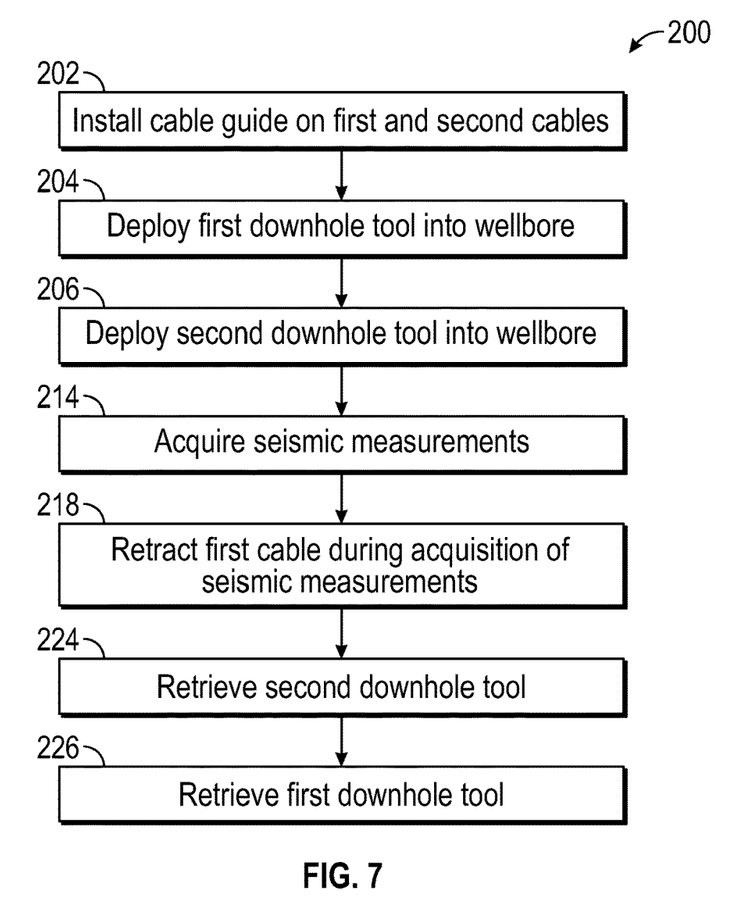
FIG. 7 is a flow diagram of an embodiment of a process of acquiring measurements within a wellbore using multiple downhole well-logging tools disposed within the wellbore, in accordance with an embodiment of the present disclosure.

With the foregoing in mind, FIG. 7 is an embodiment of a process 200 that may be employed to simultaneously acquire measurements (e.g., seismic measurements) within separate locations of the wellbore 16 by using cable guide 100 to traverse the both the first downhole tool 48 and the second downhole tool 50 through the wellbore 16 at once. In some embodiments, the seismic measurements are performed in connection with a hydraulic fracturing operation performed in a subterranean formation and the measured seismic data can be used to monitor the initiation and/or location and/or propagation of the hydraulic pressure-induced fractures in the formation. It should be noted that the steps illustrated in the process 200 are meant to facilitate discussion and are not intended to limit the scope of this disclosure, since additional steps may be performed, certain steps may be omitted, and the illustrated steps may be performed in any order. Moreover, to help illustrate the approach of the present process, the following discussion will reference FIGS. 8-11.

Figure 8:
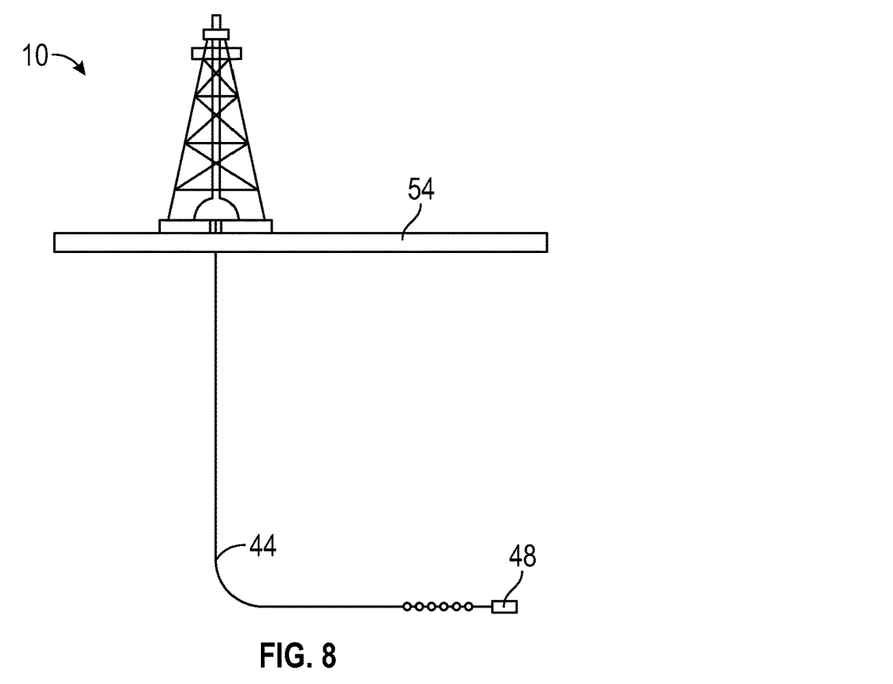
FIG. 8 is a schematic of an embodiment of the well-logging system of FIG. 1 including a first downhole tool deployed within a wellbore, in accordance with an embodiment of the present disclosure.
Figure 9:
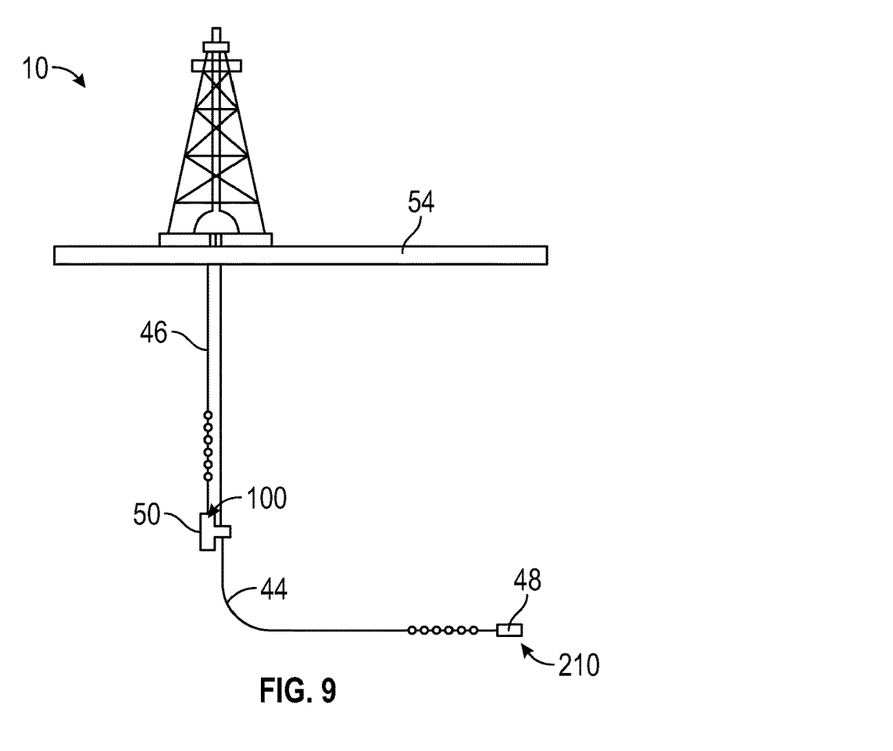
FIG. 9 is a schematic of an embodiment of the well-logging system of FIG. 8 including the first downhole tool and a second downhole tool deployed within the wellbore, in accordance with an embodiment of the present disclosure.

As shown in the illustrated embodiment of FIG. 7, the process 200 may begin with installation of the cable guide 100 on the cables 42 (e.g., the first and second cables 44, 46) of the well-logging system 10, as indicated by process block 202. For example, the first cable 44 may be extended through the sleeve 160 of the cable guide 100 prior to attaching the first cable 44 to the first downhole tool 48. Next, the cable guide 100 may be coupled to the second downhole tool 50 via the clamps 130 in accordance with the techniques discussed above. To complete installation of the cable guide 100, the sleeve 160 may be coupled to the slot 162 disposed within the chassis structure 106 of the cable guide 100. Upon proper installation of the cable guide 100, the first downhole tool 48 may be deployed into the wellbore 16, as indicated by process block 204. That is, the first winch 72 may unspool the first cable 44, such that the first cable 44 lowers the first downhole tool 48 into the wellbore 16 (e.g., as shown in FIG. 8).

The process 200 also includes deploying the second downhole tool 50 into the wellbore 16, as indicated by process block 206. In some embodiments, the second downhole tool 50 may be lowered into the wellbore 16 to a depth (e.g., a depth below the surface 54) that is less than a depth at which the first downhole tool 48 is deployed. For example, as shown in the illustrated embodiment of FIG. 9, the first downhole tool 48 may be lowered into a horizontal section 210 of the wellbore 16 that is situated at a depth beneath a depth of the second downhole tool 50 within the wellbore 16.

Figure 10:
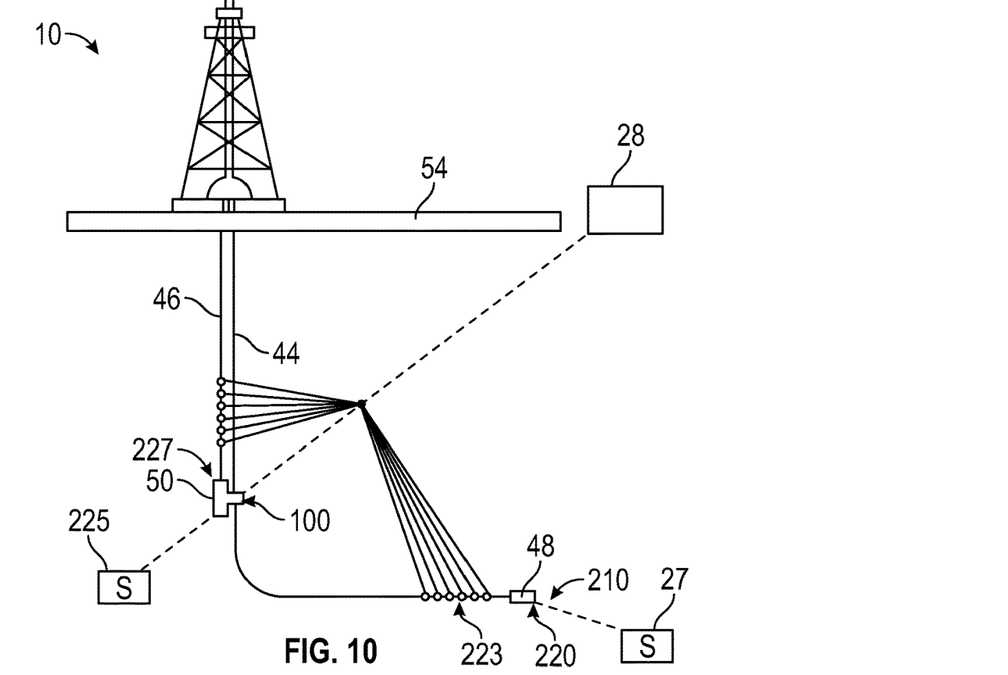
FIG. 10 is a schematic of an embodiment of the well-logging system of FIG. 9, in accordance with an embodiment of the present disclosure.
Figure 11:
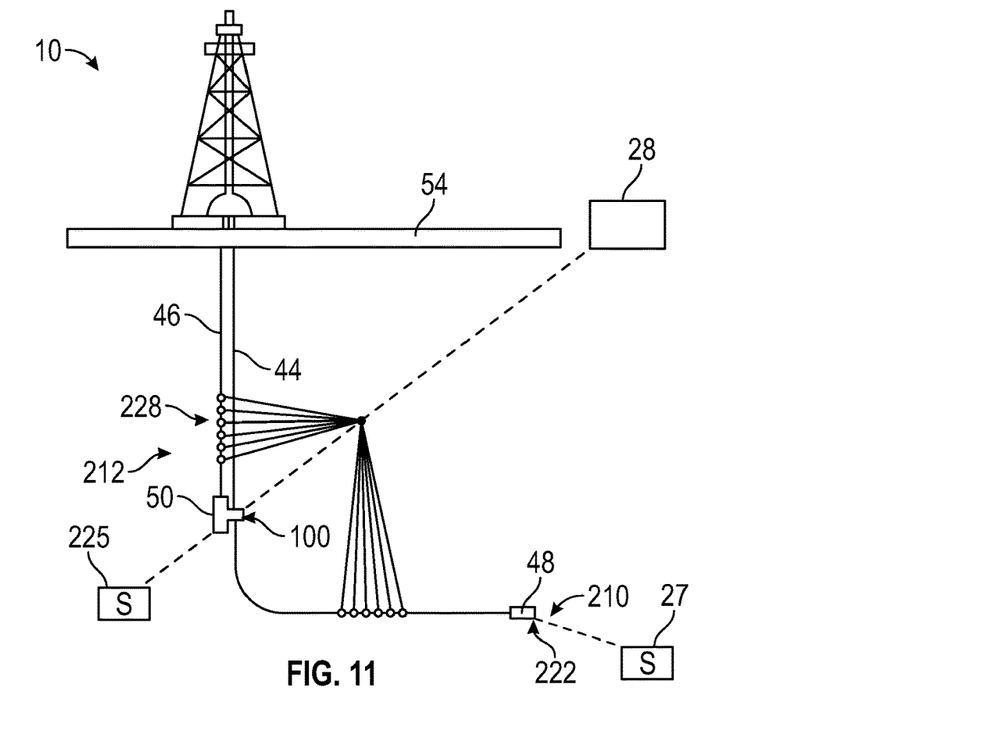
FIG. 11 is a schematic of an embodiment of the well-logging system of FIG. 10, in accordance with an embodiment of the present disclosure.

Returning to the illustrated embodiment of the process 200 of FIG. 7, the process 200 may further include acquiring well-logging measurements (e.g., seismic measurements) using the first and second downhole tools 48, 50, as indicated by process block 214. The measurements acquired by the first and second downhole tools 48, 50 may be relayed to a suitable data processing system (e.g., the data processing system 28) using any of the previously discussed telemetry methods. For example, in some embodiments, the process 200 may include retracting the first cable 44 while the first and second downhole tools 48, 50 are in a data acquisition mode (e.g., while the first and second downhole tools 48, 50 acquire wellbore measurements), as indicated by process block 218. For example, the first logging winch system 66 may retract the first cable 44 (e.g., spool the first cable 44 on the first winch 72) to move the first downhole tool 48 from a first location 220 within the wellbore 16 (e.g., as show in in FIG. 10) to a second location 222 within the wellbore 16 (e.g., as shown in FIG. 11) while the first and/or second downhole tools 48, 50 are in the data acquisition mode. As such, the first downhole tool 48 may acquire feedback (e.g., data) indicative of one or more wellbore parameters (e.g., via the one or more sensors 27) along a first section 223 of the wellbore 16 (e.g., as shown in FIG. 10) while the second downhole tool 50 may acquire feedback indicative of one or more wellbore parameters (e.g., via one or more sensors 225, as shown in FIG. 10) at a second location 227 of the wellbore 16 (e.g., as shown in FIG. 10).

For clarity, in some embodiments, the second location 227 of the wellbore 16 is not within the first section 223 of the wellbore 16.

Additionally or alternatively, the second logging system 68 may raise or lower the second downhole tool 50 within the wellbore 16 throughout operation of the first and second downhole tools 48, 50 in the data acquisition mode. That is, in such embodiments, the first downhole tool 48 may acquire feedback indicative of one or more wellbore parameters along the first section 223 of the wellbore 16 while the second downhole tool 50 simultaneously acquires feedback indicative of one or more wellbore parameters along a second section 228 of the wellbore 16 (e.g., as shown in FIG. 11) that may be different than the first section 223 of the wellbore 16. Indeed, it should be appreciate that the embodiments of the cable guide 100 disclosed herein may enable simultaneous acquisition of data or sensor feedback along multiple sections of the wellbore 16 using the first and second downhole tools 48, 50. After completion of data acquisition within the wellbore 16, the second logging system 68 may retrieve the second downhole tool 50 from the wellbore 16, as indicated by process block 224, and subsequently retrieve the first downhole tool 48, as indicated by process block 226.

Although the cable guide 100 has been described as facilitating guidance of a pair of cables (e.g., the first and second cables 44, 46) through the wellbore 16 in the discussion above, it should be appreciated that in other embodiments, the cable guide 100 may guide more than two cables through the wellbore 16. For example, the cable guide 100 may facilitate simultaneous guidance of 2, 3, 4, or more than 4 cables through the wellbore 16 in accordance with the techniques discussed above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A well-logging system, comprising:
   a first downhole tool coupled to a first cable configured to convey the first downhole tool along a wellbore;
   a second downhole tool having a housing and coupled to a second cable configured to convey the second downhole tool along the wellbore; and
   a cable guide, comprising:
      a chassis structure coupled to the housing; and
      a sleeve coupled to the chassis structure and disposed about the first cable, wherein the first cable is configured to translate along the sleeve such that the sleeve facilitates guided movement of the first downhole tool relative to the second downhole tool.

2. The well-logging system of claim 1, wherein the chassis structure comprises a clamp configured to extend about the housing and couple the chassis structure to the housing.

3. The well-logging system of claim 2, wherein the clamp is a first clamp positioned at a first end portion of the chassis structure, and the chassis structure comprises a second clamp positioned at a second end portion of the chassis structure, opposite the first end portion.

4. The well-logging system of claim 3, wherein flanges extend between the first clamp and the second clamp, wherein the flanges are configured to receive fasteners for constricting the first and second clamps to couple the chassis structure to the housing.

5. The well-logging system of claim 1, wherein a slot is formed within the chassis structure and configured to receive and removably couple to the sleeve.

6. The well-logging system of claim 1, wherein the chassis structure comprises a plurality of protrusions extending outward from an outer surface of the chassis structure, wherein the plurality of protrusions is disposed about the sleeve and extends radially beyond the sleeve with respect to a central axis of the cable guide.

7. The well-logging system of claim 6, wherein the plurality of protrusions includes a first plurality of protrusion members positioned near a first end portion of the chassis structure and a second plurality of protrusion members positioned near a second end portion of the chassis structure, wherein the first plurality of protrusion members diverges radially from the outer surface in a first direction along the chassis structure, and the second plurality of protrusion members diverges radially from the outer surface in a second direction along the chassis structure, opposite the first direction.

8. The well-logging system of claim 1, comprising a first winch coupled to the first cable and a second winch coupled to the second cable, wherein the first winch is configured to convey the first downhole tool along a first section of the wellbore and the second winch is configured to simultaneously convey the second downhole tool along a second section of the wellbore different from the first section.

9. The well-logging system of claim 8, wherein the first downhole tool includes a first sensor configured to acquire feedback indicative of a wellbore parameter along the first section of the wellbore and the second downhole tool includes a second sensor configured to acquire feedback indicative of an additional wellbore parameter along the second section of the wellbore.

10. A cable guide for a well-logging system, comprising:
a sleeve configured to extend about and translate along a cable of a first downhole tool; and
a chassis structure having one or more clamps configured to engage with a housing of a second downhole tool to couple the chassis structure to the housing, wherein the chassis structure is configured to interlock with the sleeve to couple the sleeve to the chassis structure, wherein the one or more clamps are configured to extend about the housing and constrict to couple the chassis structure to the housing, and wherein the one or more clamps include a first clamp and a second clamp located on opposing end portions of the chassis structure, wherein the chassis structure includes a slot configured to interlock with the sleeve, and wherein the slot is positioned axially between the first and second clamps.

11. The cable guide of claim 10, wherein a slot is formed within the chassis structure, and the slot is configured to receive the sleeve and interlock the sleeve with the chassis structure.

12. The cable guide of claim 11, wherein the chassis structure comprises a plurality of protrusions positioned about the slot.

13. The cable guide of claim 12, wherein the plurality of protrusions extends radially, with respect to a central axis of the cable guide, outward from an outer surface of the chassis structure and radially beyond the sleeve.

14. A method, comprising:
extending a cable of a first downhole tool through a sleeve of a cable guide such that the cable is configured to translate along the sleeve;
coupling a chassis structure of the cable guide to a housing of a second downhole tool;
interlocking the sleeve with the chassis structure of the cable guide; and
conveying, via the cable, the first downhole tool along a wellbore, wherein the cable guide is configured to guide movement of the cable relative to the second downhole tool such that the first downhole tool moves along the wellbore relative to the second downhole tool.

15. The method of claim 14, further comprising acquiring, via a first sensor of the first downhole tool, feedback indicative of a wellbore parameter along a first section of the wellbore.

16. The method of claim 15, further comprising acquiring, via a second sensor of the second downhole tool, feedback indicative of an additional wellbore parameter at a second location of the wellbore, wherein the second location of the wellbore is not within the first section of the wellbore.

17. The method of claim 14, further comprising conveying, via an additional cable of the second downhole tool, the second downhole tool along the wellbore such that the second downhole tool moves along the wellbore and relative to the first downhole tool.

18. The method of claim 17, further comprising:
acquiring, via a first sensor of the first downhole tool, feedback indicative of a wellbore parameter along a first section of the wellbore; and
acquiring, via a second sensor of the second downhole tool, feedback indicative of an additional wellbore parameter along a second section of the wellbore, wherein the second section of the wellbore is different than the first section of the wellbore.

\* \* \* \* \*